(12) United States Patent
Tomioka

(10) Patent No.: US 6,266,243 B1
(45) Date of Patent: Jul. 24, 2001

(54) ELECTRONIC APPARATUS WITH A FAN UNIT, EXTENSION APPARATUS FOR EXTENDING THE FUNCTION OF AN ELECTRONIC APPARATUS, AND ELECTRONIC APPARATUS SYSTEM

(75) Inventor: Kentaro Tomioka, Sayama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/489,012

(22) Filed: Jan. 21, 2000

(30) Foreign Application Priority Data

Jan. 21, 1999 (JP) .................................................. 11-013337

(51) Int. Cl.[7] ...................................................... H05K 7/20
(52) U.S. Cl. ......................... 361/695; 361/688; 361/689; 361/690; 361/694; 174/15.1; 174/16.1; 165/80.3; 165/104.33; 165/104.34; 165/185; 454/184; 312/223.2
(58) Field of Search ..................................... 361/687, 700, 361/686, 688–690, 694, 695, 697, 699, 704, 720, 721; 165/80.3, 80.4, 104.33, 185; 174/15.1, 16.1, 16.3; 454/184; 312/223.2

(56) References Cited

U.S. PATENT DOCUMENTS

| | | | |
|---|---|---|---|
| 5,694,292 | * | 12/1997 | Paulsel et al. ........................ 361/686 |
| 5,704,212 | * | 1/1998 | Erler et al. ............................ 361/687 |
| 5,768,101 | * | 6/1998 | Cheng ................................... 361/687 |
| 5,831,823 | * | 11/1998 | Hoedl ................................... 361/695 |
| 5,959,836 | * | 9/1999 | Bhatia ................................... 361/687 |
| 5,992,155 | * | 11/1999 | Kobayashi et al. ................... 361/687 |
| 6,084,769 | * | 7/2000 | Moore et al. ........................ 361/687 |
| 6,094,347 | * | 7/2000 | Bhatia ................................... 361/695 |

FOREIGN PATENT DOCUMENTS

411039063A * 2/1999 (JP) .
411163567A * 6/1999 (JP) .

* cited by examiner

Primary Examiner—Leo P. Picard
Assistant Examiner—Boris L. Chervinsky
(74) Attorney, Agent, or Firm—Finnegan, Henderson, Farabow, Garrett & Dunner, L.L.P.

(57) ABSTRACT

An electronic apparatus having a housing that can be removably mounted on a base having an exhaust port. The housing has an inlet port and an outlet port communicating with the inlet port. The inlet port communicates with the exhaust port of the base while the housing remains mounted on the base. The housing contains a heat-generating component and a fan unit. The fan unit draws cooling air into the housing via the inlet port and applies the cooling air toward the outlet port, thereby cooling the heat-generating component.

6 Claims, 6 Drawing Sheets

ELECTRONIC APPARATUS WITH A FAN UNIT, EXTENSION APPARATUS FOR EXTENDING THE FUNCTION OF AN ELECTRONIC APPARATUS, AND ELECTRONIC APPARATUS SYSTEM

BACKGROUND OF THE INVENTION

The present invention relates to a portable electronic apparatus such as a portable computer or a portable information tool and an extension apparatus for extending the function of the electronic apparatus. The invention also relates to an electronic apparatus system comprising the electronic apparatus and the extension apparatus, which are integrated in the form of one module.

To have an increased commercial value, it is greatly important for electronic apparatuses, such as portable computers, to excel in portability. The portable computers recently developed therefore have a housing that is thinner and lighter than before. They are small and light enough to be put into bags and the like and to be carried with.

A portable computer is compact, having a thin housing. Hence, it is difficult for the housing to have spaces for accommodating connectors for connecting input/output devices to the computer, a floppy disk drive, and a CD-ROM drive. For this reason, the portable computers recently developed each have a dedicated extension connector. The extension connector connects the computer to an extension apparatus called "docking station." The function of the portable computer is thereby so extended that the portable computer can perform functions that are comparable with those of desktop computers.

Conventional extension apparatuses have a box-shaped base each. The base has a flat mount section. The mount section is small enough to be placed on the housing of a portable computer. On the mount section, there are arranged relay connectors. The relay connectors will be electrically connected to the extension connectors of a portable computer when the housing of the computer is mounted on the mount section. The base contains various extension components such as a circuit board, a floppy disk drive, a CD-ROM drive and speakers. The circuit board has a number of circuit parts mounted on it. Various connectors and ports are arranged on the side or back of the base. These connectors and ports are provided to connect peripheral devices such as a keyboard, a display and a printer to the computer. The connectors and ports will be electrically connected to the portable computers by the relay connectors and extension connectors when the housing is mounted on the mount section of the base. The logic addresses and control signal paths (e.g., buses) of the portable computer are electrically connected to those of the extension apparatus. This extends the function of the portable computer.

The portable computers that have been recently developed have an MPU (microprocessor unit) each. The MPU is designed to process useful multimedia information that represents characters, sound, speeches and images. MPUs have been improved to process information at a higher speed and to perform more functions. The faster an MPU processes information and the more functions it performs, the more electric power it will consume. There is the trend that the heat, which the MPU generates while operating, increases in proportion to the power the MPU consumes. Once an MPU that generates much heat while operating is incorporated into the housing of a portable computer, it is necessary to enhance the efficiency of radiating the heat.

To this end, the housing of the conventional portable computer incorporates a heat sink thermally connected to the MPU and a fan unit for applying cooling air to the heat sink, thereby to cool the MPU. If the portable computer is connected to an extension apparatus to make the MPU perform complicated operations, the MPU will generate more heat. An extension apparatus designed to radiate the heat efficiently is known. The base of this extension apparatus contains a fan unit, and the mount section of the base has an exhaust port. The fan unit applies cooling air to the exhaust port. When the housing of the computer is mounted on the mount section of the base, the exhaust port comes to oppose the bottom wall of the housing. Thus, the cooling air sent through the exhaust port is applied onto the bottom wall of the housing. The housing is thereby cooled from outside. Further, the fan unit cools the MPU. The efficiency of radiating heat from the portable computer can therefore be enhanced.

The inner space of the housing, which may accommodate components, is much limited, however, because the portable computer is thin and compact. Hence, the heat sink and the fan unit need to be small enough to be incorporated into the housing. The efficiency of radiating heat from the MPU is proportional to the heat-radiating area of the heat sink and the rate of applying cooling air. If the heat sink and the fan unit are small, the heat-radiating area and the air-applying rate will proportionally decrease. The heat-radiating efficiency may not be high enough to radiate all heat that the MPU radiates while operating. In other words, the MPU may not be cooled sufficiently.

The amount of heat transmitted from the MPU to the housing is no more than a fraction of all heat that the MPU generates. Even if the housing is positively cooled with the cooling air applied onto the bottom wall of the housing, it contributes only a little to the radiation of heat from the MPU. The MPU cannot be cooled with efficiently.

Consequently, the temperature of the MPU may rise above the maximum operating temperature of the MPU. If the temperature of the MPU exceeds the maximum operating temperature, the information-processing speed of the MPU may decrease. In the worst case, the MPU may stop operating at all. In short, the MPU may fail to operate at its maximum capacity.

BRIEF SUMMARY OF THE INVENTION

The object of this invention is to provide an electronic apparatus, an extension apparatus for extending the function of the electronic apparatus, and an electronic apparatus system, in which cooling air can be introduced into the housing at a rate high enough to radiate all heat the heat-radiating component generates while operating, which are simple in structure, and whose housing can be compact.

To achieve this object, an electronic apparatus according to the present invention can be connected to an extension apparatus that has a base having an exhaust port. The electronic apparatus comprises:

a housing to be removably mounted on the base, the housing having an inlet port to communicate with the exhaust port when the housing is mounted on the base and having an outlet port communicating with the inlet port;

a heat-generating component provided in the housing; and a fan unit provided in the housing, for drawing cooling air into the housing through the inlet port and applying the cooling air toward the outlet port to cool the heat-generating component.

In order to attain the above object, an electronic apparatus system according to the invention comprises:

an electronic apparatus having a housing, a heat-generating component provided in the housing, and a fan unit provided in the housing, for drawing cooling air into the housing, thereby to cool the heat-generating component; and an extension apparatus having a base on which the housing of the electronic apparatus is mounted, and components provided in the base, for extending a function of the electronic apparatus.

The housing of the electronic apparatus has an inlet port for drawing cooling air into the housing and an outlet port for exhausting the cooling air from the housing. The base of the extension apparatus has an opening communicating with the inlet port while the housing remains mounted on the base.

In the electronic apparatus system, the interior of the housing communicates with the interior of the base through the inlet port and the opening while the housing remains mounted on the base. A negative pressure acts therefore in the inlet port when the fan unit starts operating as the temperature of the heat-generating component rises. Therefore, air is drawn from the base into the housing via the opening. The air flows in the housing, serving as cooling air. The cooling air effectively cools the heat-generating component provided in the housing.

While the electronic apparatus remains mounted on the extension apparatus, an air passage is formed, extending from the interior of the base to the interior of the housing. The fan unit is provided in the middle part of the air passage. Hence, that part of the passage, which is upstream of the fan unit, works as an air chamber for accumulating the cooling air. The volume of the air chamber is large, comparable with the inner space of the base. The resistance to the cooling air being drawn into the housing via the inlet port therefore decreases, whereby the cooling air can flow in the housing in a sufficient amount.

With the structure of the electronic apparatus system, it is possible to enhance the efficiency of radiating heat from the heat-generating component because the interior of the housing communicates with the interior of the base. Neither the base nor the housing needs to have a complex structure to improve the heat-radiating efficiency. Nor is it necessary to increase the air-applying rate of the fan unit. Even if the fan unit is made smaller as required, heat can be radiated from the heat-radiating component with a sufficiently high efficiency. Hence, the housing needs only to have a small space for accommodating the fan unit. The electronic apparatus can therefore be made thin and compact, without difficulty.

In order to achieve the object described above, an extension apparatus according to the invention is one to which an electronic apparatus having a housing having an inlet port and a first fan unit provided in the housing for drawing cooling air into the housing through the inlet port is to be removably connected. The extension apparatus comprises:

a base on which the housing of the electronic apparatus is to be removably mounted, the base having an exhaust port to communicate with the inlet port of the housing when the housing is mounted on the base;

components which are provided in the base and which are to be electrically connected to the electronic apparatus when the housing is mounted on the base; and a second fan unit provided in the base, for forming a stream of cooling air in the base, which flows towards the exhaust port.

When the housing of the electronic apparatus is mounted on the base of the extension apparatus, the inlet port communicates with the exhaust port. An air passage is thereby formed, which extends from the interior of the base to the interior of the housing. When the first fan unit is driven as the temperature of the electronic apparatus rises, a negative pressure acts in the inlet port, whereby air is drawn into the housing through the inlet port. The air flows in the housing, as cooling air that effectively cools the electronic apparatus.

The second fan unit is driven whenever the first fan unit is driven. The second fan unit generates a stream of cooling air, which flows toward the exhaust port. At least a part of the cooling air is applied from the exhaust port to the inlet port and into the housing through the inlet port. In the housing, the cooling air flows together with the cooling air applied by the first fan unit, effectively cooling the electronic apparatus.

Since the cooling air applied through the exhaust port of the base is added to the cooling air drawn into the housing, the resistance to the cooling air drawn into the housing via the inlet port can be minimized. The rate at which the cooling air flows in the housing therefore increases. This enhances the efficiency of radiating heat from the electronic apparatus.

With this structure, the cooling air exhausted via the exhaust port of the base is led into the housing, thereby enhancing the efficiency of radiating heat from the heat-generating component. Hence, neither the base nor the housing need be complex in structure. Nor is it necessary to increase the air-applying efficiency of the first fan unit. Heat can be efficiently radiated from the heat-generating component even if the first fan unit is small as required. The housing need not have a large space for accommodating the first fan unit. The electronic apparatus can therefore be made thin and compact, without difficulty.

To achieve the object described above, an electronic apparatus system according to the invention comprises:

an electronic apparatus having a housing, a heat-generating component provided in the housing, and a first fan unit provided in the housing, for drawing cooling air into the housing, thereby to cool the heat-generating component; and an extension apparatus having a base on which the housing of the electronic apparatus is mounted, components provided in the base, for extending a function of the electronic apparatus, and a second fan unit for forming a stream of cooling air in the base.

The housing has an inlet port communicating with the first fan unit, for drawing cooling air into the housing. The base has an exhaust port to which the cooling air is guided by the second fan unit. The inlet port and the exhaust port communicate with each other while the housing remains mounted on the base.

When the housing of the electronic apparatus is mounted on the base of the extension apparatus, the inlet port communicates with the exhaust port. An air passage is thereby formed, which extends from the interior of the base to the interior of the housing. When the first fan unit is driven as the temperature of the heat-generating component rises, a negative pressure acts in the inlet port, whereby air is drawn into the housing through the inlet port. The air flows in the housing, as cooling air that effectively cools the heat-generating component.

The second fan unit is driven whenever the first fan unit is driven. The second fan unit generates a stream of cooling air, which flows toward the exhaust port. At least a part of the cooling air is applied from the exhaust port to the inlet port and into the housing through the inlet port. In the housing, the cooling air flows together with the cooling air applied by the first fan unit, effectively cooling the heat-generating component.

Since the cooling air applied through the exhaust port of the base is added to the cooling air drawn into the housing, the resistance to the cooling air drawn into the housing via the inlet port can be minimized. The rate at which the cooling air flows in the housing therefore increases. This enhances the efficiency of radiating heat from the heat-generating component.

With this structure, the cooling air exhausted via the exhaust port of the base is led into the housing, thereby enhancing the efficiency of radiating heat from the heat-generating component. Hence, neither the base nor the housing need be complex in structure. Nor is it necessary to increase the air-applying efficiency of the first fan unit. Heat can be efficiently radiated from the heat-generating component even if the first fan unit is small as required. The housing need not have a large space for accommodating the first fan unit. The electronic apparatus can therefore be made thin and compact, without difficulty.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The first embodiment of the present invention will be described, with reference to FIGS. 1 to 4.

Figure 1:
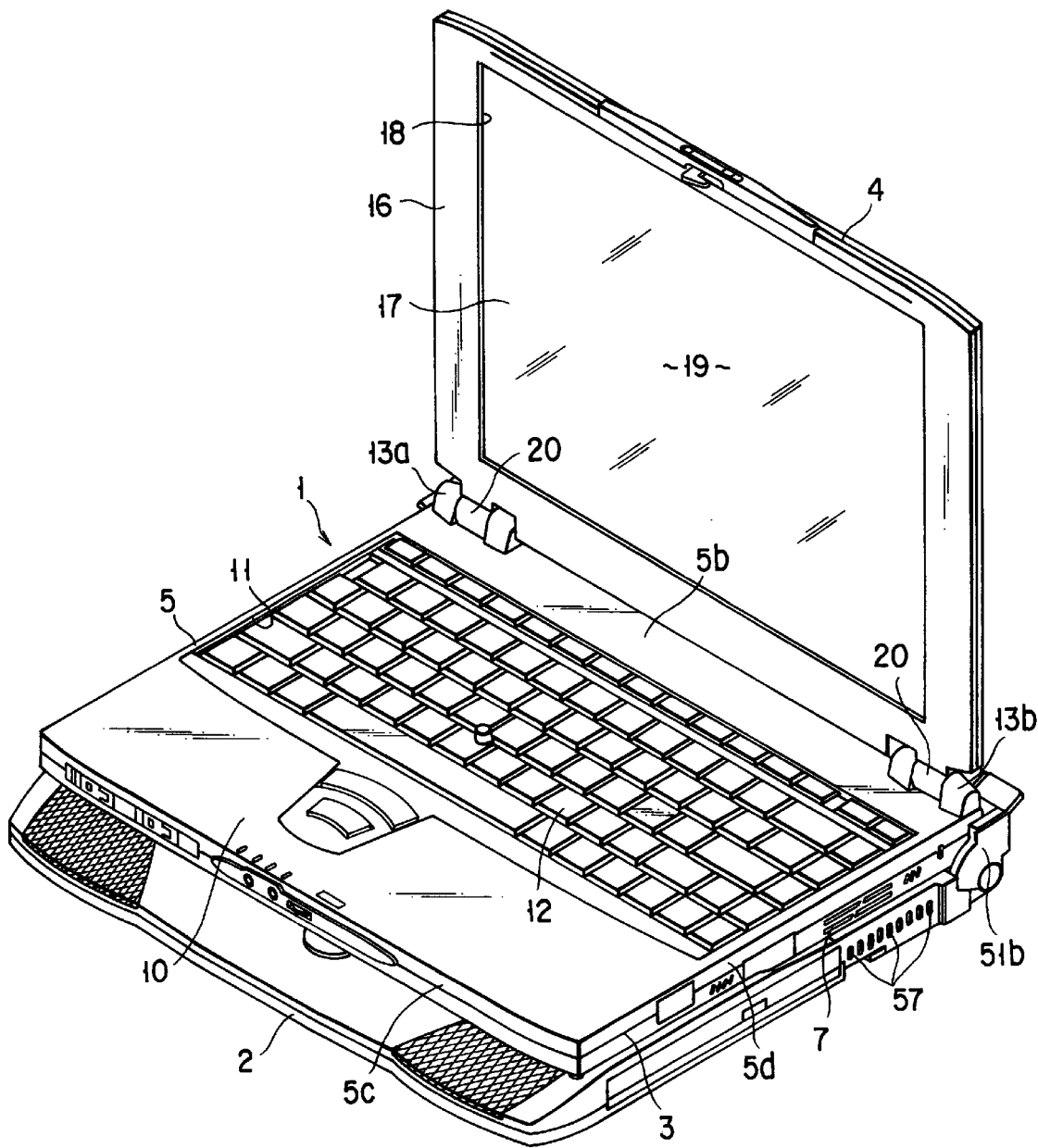
FIG. 1 is a perspective view of an electronic apparatus system that is the first embodiment of the invention, showing the extension apparatus and the portable computer connected to the extension apparatus.
Figure 2:
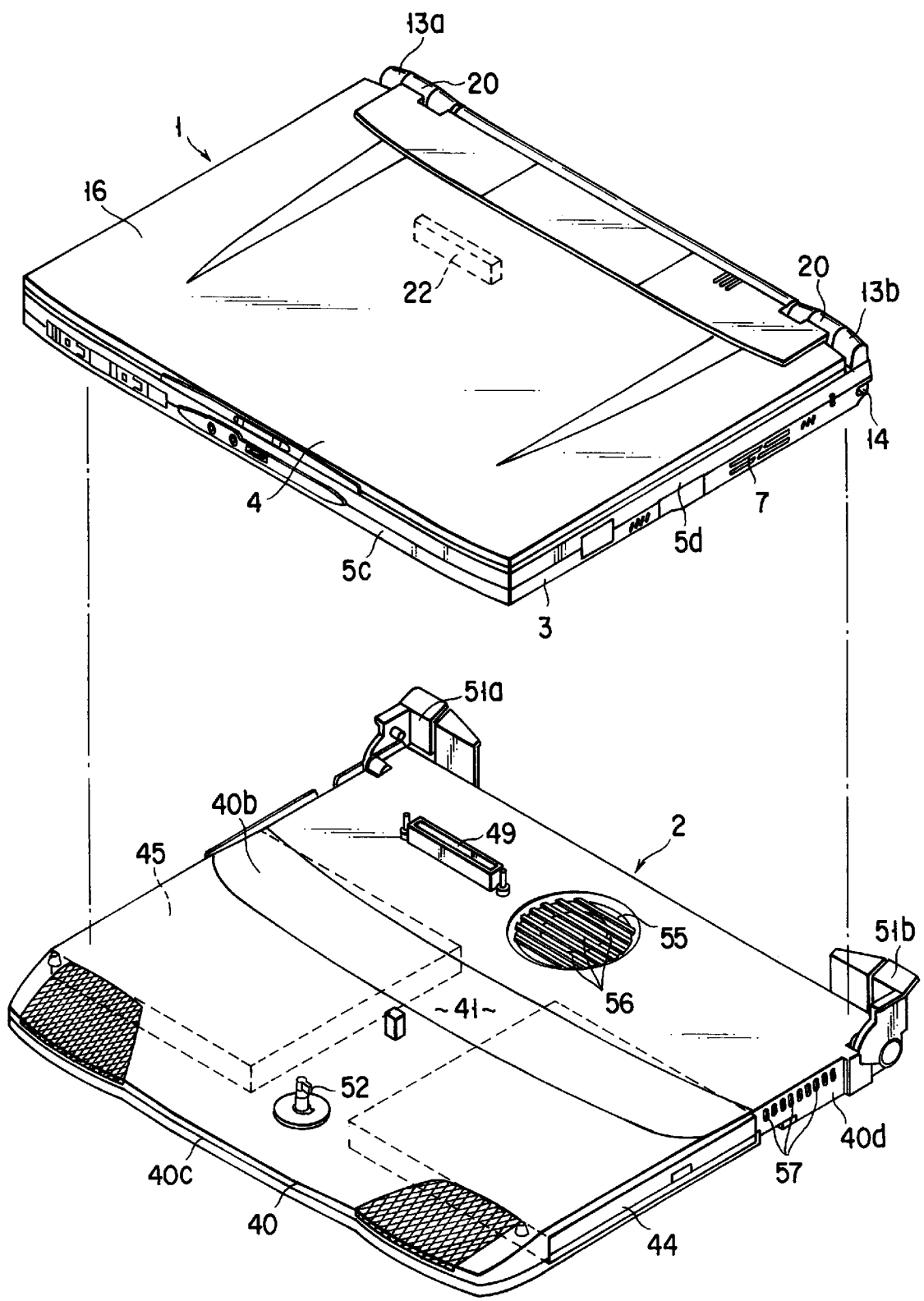
FIG. 2 is an exploded view of the first embodiment, illustrating the portable computer disconnected from the extension apparatus.

FIGS. 1 and 2 show a portable computer 1, or an electronic apparatus according to the invention, and an extension apparatus 2 for extending the function of the portable computer 1.

The portable computer 1 comprises a main body 3 and a display unit 4. The display unit 4 is supported by the main body 3. The main body 3 has a housing 5 made of metal. The housing 5 has a bottom wall 5a, a top wall 5b, a front wall 5c, two side walls 5d, and a rear wall 5e. The housing 5 is shaped like a flat box and is thinner than the housings of the conventional portable computers.

Figure 3:
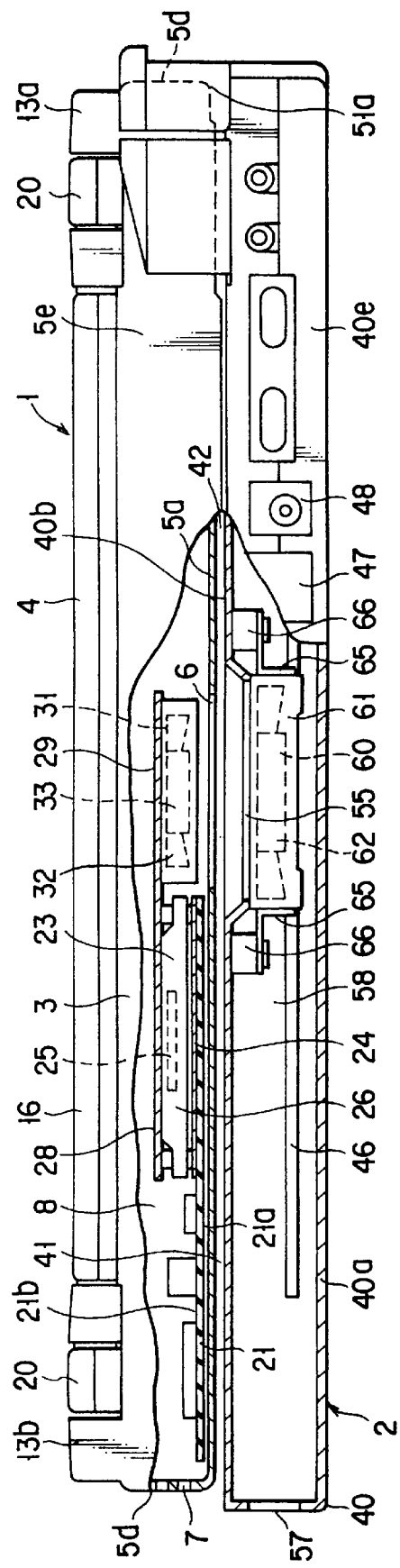
FIG. 3 is a sectional view of the first embodiment, depicting the portable computer mounted on the mount section of the extension apparatus.

As shown in FIG. 3, the bottom wall 5a of the housing 5 has an inlet port 6. The inlet port 6 is made in the rear-middle part of the bottom wall 5a. The right side wall 5d has an outlet port 7. The outlet port 7 is made in the rear part of the right side wall 5d. The inlet port 6 and the outlet port 7 are connected by an air passage 8 provided in the housing 5.

The top wall 5b of the housing 5 has a palm rest 10 and a keyboard recess 11. The palm rest 10 extends in the widthwise direction of the housing 5. The keyboard recess 11 is located at the back of the palm rest 10. A keyboard 12 is fitted in the recess 11. A pair of display supports 13a and 13b are provided on the rear part of the top wall 5b of the housing 5. The display supports 13a and 13b protrude upwards and are spaced apart in the width direction of the housing 5.

As shown in FIG. 2, the housing 5 has two engagement recesses 14 in the rear parts of the side walls 5d, respectively. The engagement recesses 14 are used to connect the portable computer 1 to the extension apparatus 2. Each engagement recesses 14 opens sideways, downwards and rearwards.

The display unit 4 comprises a display housing 16 and a liquid crystal display 17. The display housing 16 is shaped like a flat box and has an opening 18 in the front. The liquid crystal display 17 has a screen 19 for displaying information such as characters and images. The screen 19 is exposed outside the display housing 16, through the opening 18.

The display housing 16 has two legs 20. The legs 20 protrude from one side of the display housing 16. One leg 20 is rotatably coupled to the display support 13a by a hinge device (not shown). Similarly, the other leg 20 is rotatably coupled to the display support 13b by a hinge device (not shown). The display unit 4 can therefore rotate between a closed position and an opened position. In the closed position, the display unit 4 covers the palm rest 10 and the keyboard 12 from above. In the opened position, the display unit 4 stands upright at the back of the keyboard 12.

As shown in FIG. 3, the housing 5 contains a circuit board 21. The circuit board 21 is arranged below the keyboard 12, extending parallel to the bottom wall 5a of the housing 5. The lower surface 21a of the circuit board 21 oppose the bottom wall 5a. A first extension connector 22 is mounted on the lower surface 21a and at the rear end of the circuit board 21. The first extension connector 22 is exposed at the bottom wall 5a of the housing 5, through the opening (not shown) made in the bottom wall 5a.

Figure 4:
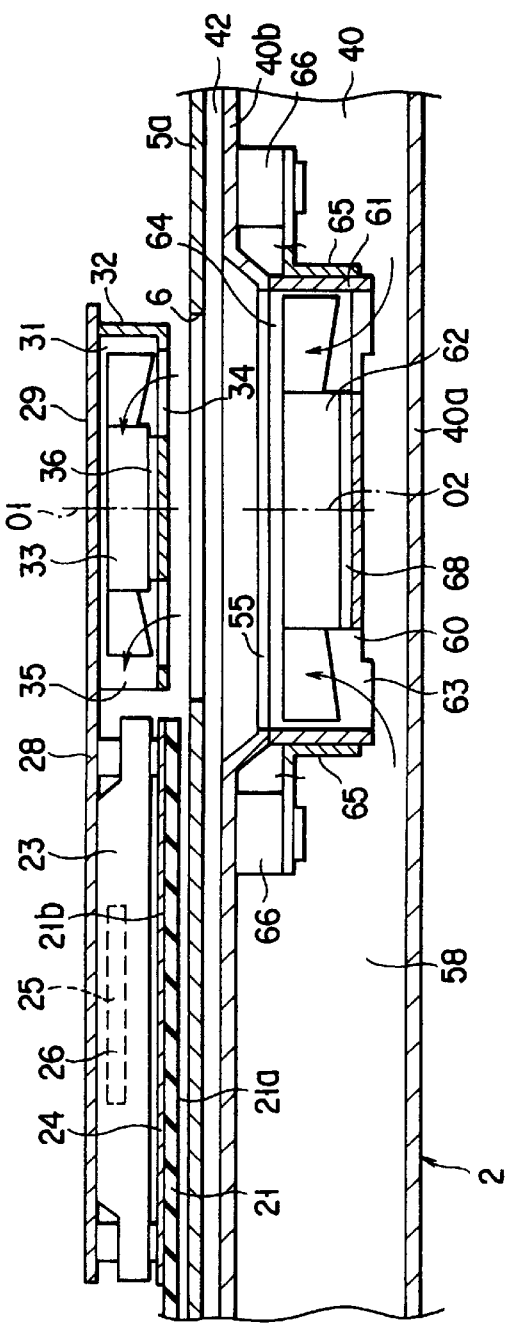
FIG. 4 is a sectional view of a part of an electronic apparatus system that is the first embodiment, illustrating the positional relation between the first and second fan units provided in the portable computer and extension apparatus, respectively.

As shown in FIGS. 3 and 4, a MPU (microprocessor unit) 23, or a heat-generating component, is mounted on the upper surface 21b of the circuit board 21. The MPU 23 is supported by a holder 24 on the upper surface 21a of the circuit board 21 and located in the air passage 8 provided in the housing 5. The MPU 23 has an IC chip 25 and a case 26. The case 26 is made of metal and covers the IC chip 25. The IC chip 25 consumes much electric power while operating to process, at high speed, useful multimedia information that represents characters, sound, speeches and images. The IC chip 25 generates much heat while operating and needs to be cooled.

The case 26 is thermally connected to a heat sink 28. The heat sink 28 is made of metal having high thermal conductivity, such as aluminum alloy. The heat sink 28 shaped like a flat plate, arranged parallel to the bottom wall 5a of the housing 5. The heat sink 28 has a fan-holding section 29. The fan-holding section 29 extends sideways from the MPU 23 and opposes the inlet port 6 made in the bottom wall 5a. A first fan unit 31 is secured to the lower surface of the fan-holding section 29.

The first fan unit 31 comprises a fan casing 32 and a rotor 33. The fan casing 32 is mounted on the lower surface of the fan-holding section 29. The fan casing 32 is shaped like a flat box and has an inlet port 34 and an outlet port 35. The inlet port 34 is made in the bottom of the casing 32; it communicates with the inlet port 6. The outlet port 35 is made in one side of the casing 32; it opposes the MPU 23. The rotor 33 is connected to a flat motor 36, which is secured to the fan casing 32. The first fan unit 31, thus constructed, is set in horizontal position within the housing 5 and opposes the inlet port 6, with the axis O1 of the rotor 33 extending vertically.

The first fan unit 31 is driven when the ambient temperature of the MPU 23 reaches a temperature close to the maximum operating temperature of the MPU 23. Once the unit 31 is thus driven, a negative pressure acts in the inlet port 6 of the housing 5 via the inlet port 34 of the fan casing 32. Air is drawn into the housing 5 from outside through the inlet port 6. The air, thus drawn into the housing 5, flows from the outlet port 35 of the casing 32 to the MPU 23, serving as cooling air for the MPU 23.

As seen from FIGS. 2 and 3, the extension apparatus 2 has a base 40. The base 40 is a flat box having a bottom wall 40a, a top wall 40b, a front wall 40c, left and right side walls 40d, and a rear wall 40e. Like the housing 5 of the portable computer 1, the base 40 is made thin. The base 40 may be mounted on, for example, the top plate of a desk.

The base 40 has a flat mount section 41. The mount section 41 is made of the top wall 40b of the base 40. The housing 5 of the portable computer 1 is removably mounted on the mount section 41. The mount section 41 is as large as the bottom wall 5a of the housing 5. As long as the housing 5 remains placed on the mount section 41, a gap 42 is provided between the top wall 40b of the base 40 and the bottom wall 5a of the housing 5.

The base 40 contains a CD-ROM drive 44, a floppy disk drive 45, and a circuit board 46. The CD-ROM drive 44 and the floppy disk drive 45 are components that extend the function of the portable computer 1. Both drives 44 and 45 are electrically connected to the circuit board 46. The circuit board 46 is located at the rear half of the base 40, extending parallel to the bottom wall 40a of the base 40. Relay connectors 47 and a power-supply connector 48 are arranged on the rear wall 40e of the base 40. The relay connectors 47 are provided to connect peripheral devices such as a printer and a keyboard to the extension apparatus 2. The connectors 47 and 48 are mounted on the circuit board 46.

As shown in FIG. 2, the second extension connector 49 is arranged on the mount section 41. The second extension connector 49 is mounted on the upper surface of the circuit board 46. The connector 49 penetrates through the top wall 40b of the base 40 and is exposed at the top of the mount section 41. When the housing 5 of the portable computer 1 is placed on the mount section 41, the first and second extension connectors 22 and 49 are connected, one fitted into the other. Thus, the portable computer 1 is electrically connected to the extension apparatus 2.

As seen from FIGS. 1 and 2, the extension apparatus 2 has a pair of rear lock levers 51a and 51b and a front lock lever 52. The lock levers 51a, 51b and 52 are provided to lock the housing 5 of the computer 1 to the mount section 41. The rear lock levers 51a and 51b are spaced apart in the widthwise direction of the base 40, at the rear end of the mount section 41. The levers 51a and 51b are supported by the base 40, and can rotate between a locked position and a released position. In the locked position, each rear lock lever fits in the engagement recess 14 of the housing 5. In the released position, each rear lock lever is outside the engagement recess 14. The front lock lever 52 is located at the front-middle part of the mount section 41. The front lock lever 52 is supported by the base 40, and can vertically move between a locked position and a released position. In the locked position, the front lock lever 52 holds the bottom wall 5a of the housing 5. In the released position, the front lock lever 52 is released from the bottom wall 5a of the housing 5.

Hence, when the portable computer 1 is mounted on the mount section 41 of the base 40, it is locked to the mount section 41 at three parts, i.e., two rear end parts and one front end part.

As FIGS. 2 to 4 show, the mount section 41 of the base 40 has an opening, or an exhaust port 55. The exhaust port 55 is made in the rear-middle part of the top wall 40b; it communicates with the interior of the base 40. The exhaust port 55 opposes the inlet port 6 made in the bottom wall 5a of the portable computer 1 and communicates with the gap 42 between the computer 1 and the mount section 41 as long as the portable computer 1 is mounted on the mount section 41 and locked thereto. A lattice-shaped guard 56 is fitted in the exhaust port 55 to prevent things such as paper clips from entering the base 40.

The right side wall 40d of the base 40 has a plurality of inlet ports 57. The inlet ports 57 opens at the rear end part of the right side wall 40d. The inlet ports 57 are connected to the exhaust port 55 by an air passage 58 that is provided in the base 40.

The base 40 contains a second fan unit 60. The second fan unit 60 has a fan casing 61 and a rotor 62. The fan casing 61 is shaped like a flat box. The casing 61 has an inlet port 63 and an outlet port 64, which oppose each other. A plurality of brackets 65 are secured to the outer periphery of the fan casing 61. The brackets 65 are secured by screws to seats 66 that extend downwards from the inner surface of the top wall 40b. Therefore, the fan casing 61 is fastened to the base 40, with the outlet port 64 and inlet port 63 opposing the exhaust port 55 and the bottom wall 40a, respectively. The rotor 62 is connected to a flat motor 68, which is secured to the fan casing 61. The rotor 62 is located between the inlet port 63 and outlet port 64. The second fan unit 60, thus structured, is positioned in the base 40 and near the exhaust port 55, with the axis O2 of the rotor 62 extending vertically.

The second fan unit 60 is driven, along with the second fan unit 31, when the ambient temperature of the MPU 23 reaches a temperature close the maximum operating temperature of the MPU 23. Once the second fan unit 60 is thus driven, a negative pressure acts in the inlet port 63 of the fan casing 61. Air therefore flows through the air passage 58 provided in the base 40, from the inlet ports 57 toward the inlet port 63. The serves as cooling air as it flows from the outlet port 64 toward the exhaust port 55 of the mount section 41.

In order to extend the function of the portable computer 1, the housing 5 of the computer 1 is mounted on the mount section 41 of the base 40, thereby fitting the first and second extension connectors 22 and 49, one into the other. Then, the housing 5 is locked to the mount section 41 by means of the rear lock levers 51a and 51b and the front lock lever 52. This maintains the connection between the extension connectors 22 and 49. The portable computer 1 is thereby connected to the extension apparatus 2 electrically.

Once the portable computer 1 is locked to the mount section 41, the bottom wall 5a of the housing 5 opposes the mount section 41, providing the gap 42 between the bottom wall 5a and the mount section 41. Further, the inlet port 6 of the housing 5 and the exhaust port 55 of the base 40 oppose each other. Because of this, the air passages 8 and 58 provided in the housing 5 and base 40, respectively, communicate with each other.

As long as the portable computer 1 is used, while connected to the extension apparatus 2, the ambient temperature of the MPU 23 may reach a temperature that is close to the maximum operating temperature of the MPU 23. In this event, both fan units 31 and 60 are driven. The first fan unit 31 draws air from outside the housing 5 through the inlet port 6 and the gap 42. This is because the inlet port 34 of the first fan unit 31 communicates with the inlet port 6 of the housing 5. The air rushes through the outlet port 35 into the air passage 8 provided in the housing 5. It is then applied as cooling air onto the MPU 23. The cooling air effectively cools the MPU 23 as it flows through the air passage 8. Finally, the cooling air flows out of the housing 5 through the outlet port 7.

When the second fan unit 60 is driven, air is drawn from the interior of the base 40 into the inlet port 63. The air flows towards the second fan unit 60 through the air passage 58 provided in the base 40. The air rushes upwards from the outlet port 64 to the exhaust port 55. As indicated above, the exhaust port 55 opposes the inlet port 6. At least a part of the air rushing through the exhaust port 55 therefore flows through the inlet port 6 into the air passage 8 provided in the housing 5 and serves as cooling air. The cooling air flowing from the exhaust port 55 flows through the air passage 8, together with the cooling air applied by the first fan unit 31. Both streams of cooling air cool the MPU 23 efficiently.

When the portable computer 1 is connected to the extension apparatus 2, the air passage 8 provided in the housing 5 communicates with the air passage 58 provided in the base 40. Hence, the cooling air flowing through the exhaust port 55 of the base 40 is added to the cooling air drawn into the housing 5 by the first fan unit 31. The resistance to the cooling air drawn into the housing 5 through the inlet port 6 can therefore minimized. This increases the rate at which the cooling air flows through the air passage 8 provided in the housing 5. Hence, the extension apparatus 2 can enhance the efficiency of radiating heat from the MPU 23 to a desired value. Therefore, the MPU 23 can be maintained at appropriate operating temperatures.

In addition, the efficiency of radiating heat from the MPU 23 can be enhanced merely by connecting the air passage 58 in the base 40 to the air passage 8 provided in the housing 5. Thus, the housing 5 or the base 40 need not be complicated in structure in order to increase that efficiency. Nor is it necessary to augment the air-applying ability of the first fan unit 31. Even if the first fan unit 31 is made small as is required, heat can be radiated from the MPU 23 with high efficiency. The housing 5 need not have a large space for accommodating the first fan unit 31. The housing 5 can therefore be made thin and small, without difficulty.

Figure 5:
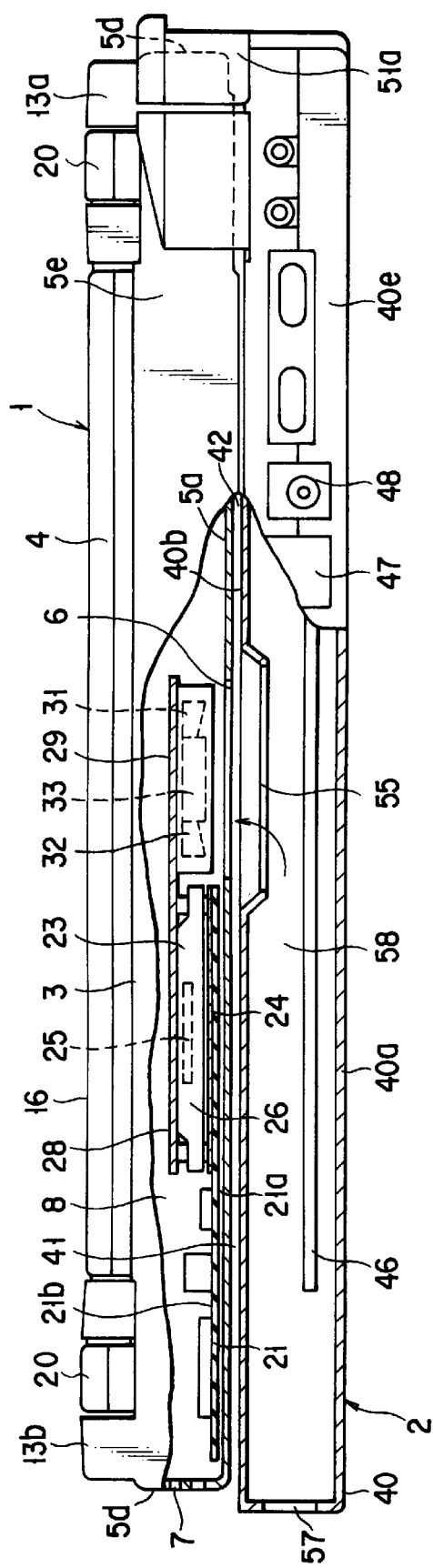
FIG. 5 is a sectional view of the second embodiment, showing the portable computer mounted on the mount section of the extension apparatus.

The present invention is not limited to the first embodiment described above. FIG. 5 shows the second embodiment of the invention. The second embodiment differs from the first embodiment in that the extension apparatus 2 has no fan units for applying air. It is similar to the first embodiment in the structure of the portable computer 1 and the basic structure of the extension apparatus 2. Therefore, the components identical to those of the first embodiment are designated at the same reference numerals and will not be described in detail.

As shown in FIG. 5, the inlet port 6 of the housing 5 opposes the exhaust port 55 of the base 40 as long as the housing 5 of the computer 1 stays in the locked position, overlapping the mount section 41 of the extension apparatus 2. Thus, the air passage 8 in the housing 5 communicates with the air passage 58 provided in the base 40. The first fan unit 31 is therefore positioned in the junction of the air passages 8 and 58.

This means that the air passage 58 that have a volume comparable with that of the base 40 exists on the upstream side of the first fan unit 31, with respect to the flow of cooling air. The first fan unit 31 therefore draws air, or cooling air, from mainly the air passage 58. Thus, the air passage 58 provided in the base 40 functions as a large air chamber for storing air, as long as the portable computer 1 remains connected to the extension apparatus 2. When the passage 58 function as such, the resistance to the cooling air drawn into the inlet port 6 from the first fan unit 31 becomes low. The rate at which the cooling air is applied into the housing 5 increases in inverse proportion to the resistance. That is, the extension apparatus 2 enhances the efficiency of radiating heat from the MPU 23. The MPU 23 can thereby be maintained at appropriate operating temperatures.

Figure 6:
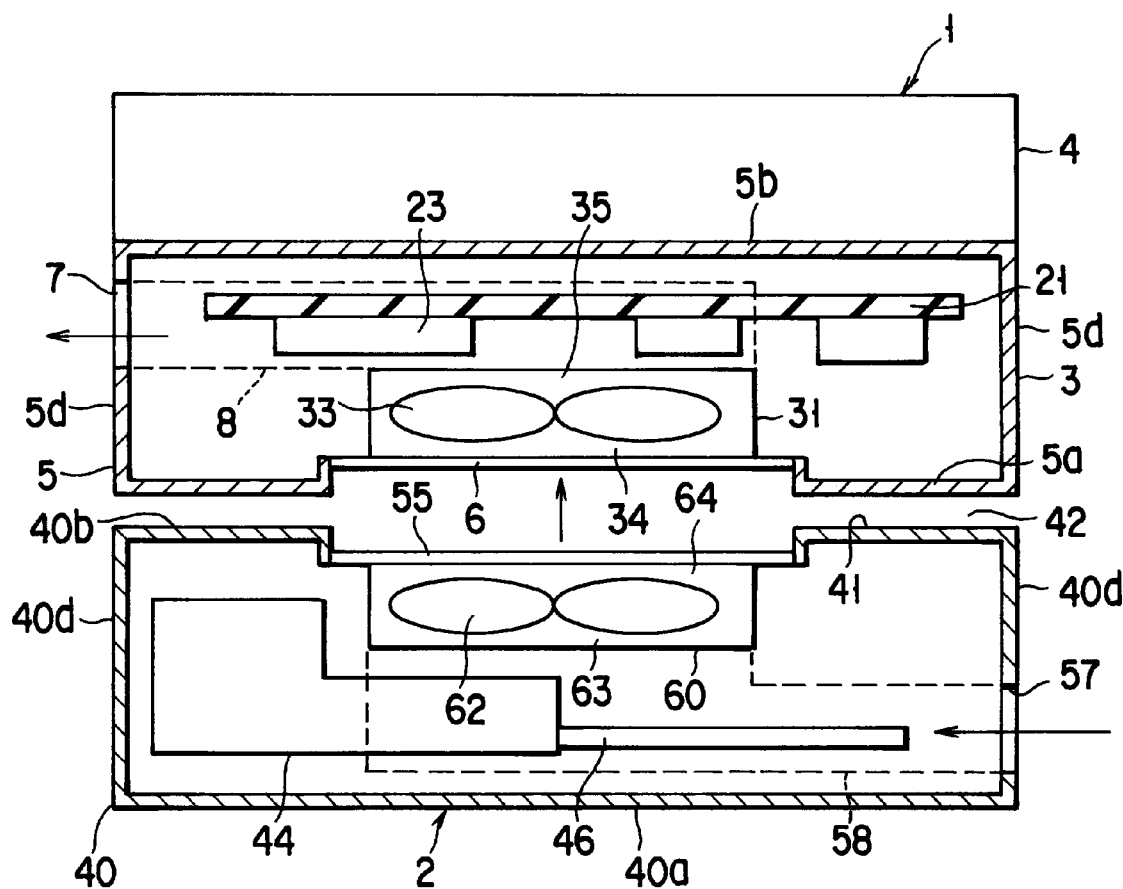
FIG. 6 is a sectional view of an electronic apparatus system that is the third embodiment of the invention, schematically illustrating how cooling air flows from the extension apparatus into the portable computer.

FIG. 6 shows an electronic apparatus system that is the third embodiment of the invention. In the third embodiment, the first fan unit 31 is located below the MPU 23. Except for this point, the third embodiment is identical to the first embodiment. As seen from FIG. 6, the outlet port 35 of the first fan unit 31 opposes the inlet port 34, and the rotor 33 is positioned between the outlet port 35 and the inlet port 34. The first fan unit 31 can therefore applies cooling air toward the MPU 23 that is located above it.

Figure 7:
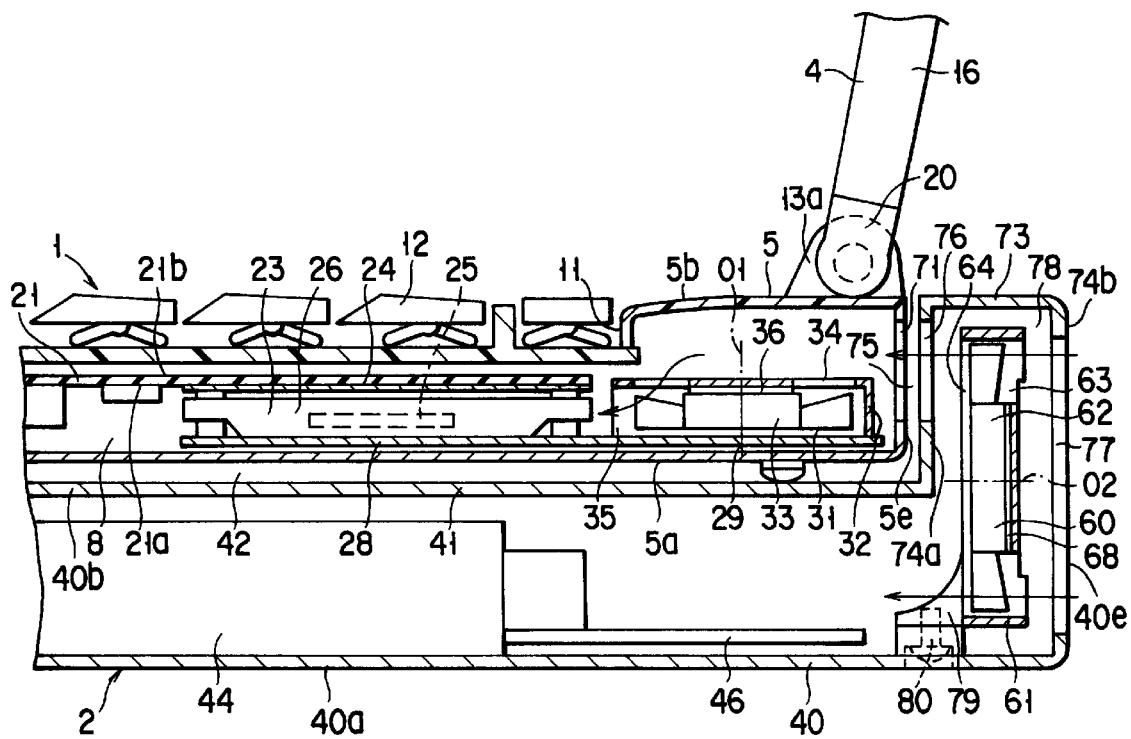
FIG. 7 is a sectional view of an electronic apparatus system that is the fourth embodiment of the invention, showing the portable computer mounted on the mount section of the extension apparatus.

FIG. 7 illustrates an electronic apparatus system that is the fourth embodiment of the invention. The fourth embodiment is different from the first embodiment in the direction in which the cooling air flows from the extension apparatus 2 to the portable computer 1. It is similar to the first embodiment in the basic structures of the portable computer 1 and extension apparatus 2. Therefore, the components identical to those of the first embodiment are designated at the same reference numerals and will not be described in detail.

As FIG. 7 shows, the housing 5 of the portable computer 1 has an inlet port 71 in the rear wall 5e. The inlet port 71 opens at the upstream end of the air passage 8. The MPU 23 is mounted on the lower surface 21a of the circuit board 21 by means of the holder 24. The heat sink 28 is thermally connected to the lower surface of the case 26, and extends along the bottom wall 5a of the housing 5. It has a fan-holding section 29 that protrudes toward the rear side of the MPU 23. The first fan unit 31 is arranged on the upper surface of the fan-holding section 29. The first fan unit 31 is set in the horizontal position, with the axis O1 of its rotor 33 extending vertically. The fan casing 32 has an inlet port 34, which opens upwards. The inlet port 34 communicates with the inlet port 71 at the upstream end of the air passage 8.

The base 40 of the extension apparatus 2 has a hollow projection 73. The projection 73 protrudes up from the rear end of the mount section 41 and extends into the base 40. The projection 73 has a front wall 74a and a rear wall 74b. The front wall 74a stands upright, opposing the rear wall 5e of the housing 5 as long as the portable computer 1 is mounted on the mount section 41. A gap 75 is thereby provided between the front wall 74a and the rear wall 5e. The front wall 74a has an exhaust port 76. The exhaust port 76 opposes the inlet port 71 of the housing 5 while the portable computer 1 remains mounted on the mount section 41. The rear wall 74b opposes the front wall 74a, and is continuous to the rear wall 40e of the base 40. The rear walls 40e and 74b have an inlet port 77 each. The inlet ports 77 oppose the exhaust port 76 at their upper ends. The upper ends of the inlet ports 77 are connected to the exhaust port 76 by an air passage 78 provided in the projection 73.

The second fan unit 60 is provided in the rear end of the base 40. The second fan unit 60 is arranged in a vertical position, with the axis O2 of the rotor 62 extending in the depth direction of the base 40. The fan casing 61 of the fan unit 60 has a support section 79 at the lower end. The support section 79 is secured to the bottom wall 40a of the base 40 by means of screws 80. The support section 79, thus secured, supports the second fan unit 60 in vertical position. The upper part of the fan casing 61 extends into the air passage 78 provided in the projection 73. The inlet port 63 of the fan casing 61 opposes the inlet port 77 of the base 40. The outlet port 64 of the casing 61 has its upper end opposing the exhaust port 76 of the projection 73 and its lower end located in the base 40.

Hence, a negative pressure acts in the inlet port 77 via the inlet port 63 of the fan casing 61 when the second fan unit 60 is driven. Air is drawn into the base 40 from outside the extension apparatus 2. The air serves as cooling air while flowing from the outlet port 64 of the fan casing 61 into the base 40 through the air passage 78.

In the fourth embodiment thus structured, the air passage 8 in the housing 5 is connected to the air passage 78 provided in the projection 73 of the base 40 when the portable computer 1 is connected to the extension apparatus 2. Part of the cooling air applied from the second fan unit 60 therefore flows into the housing 5 via the exhaust port 76 and inlet port 71, as is indicated by the arrow in FIG. 7. This part of the cooling air flows through the air passage 8, together with the cooling air applied by the first fan unit 31.

As long as the personal computer 1 remains connected to the extension apparatus 2, the cooling air flowing through the exhaust port 76 of the base 40 is added to the cooling air drawn into the housing 5 by the first fan unit 31. The resistance to the cooling air drawn into the housing 5 through the inlet port 71 can therefore minimized. This increases the rate at which the cooling air flows through the air passage 8 provided in the housing 5. Hence, the extension apparatus 2 can enhance the efficiency of radiating heat from the MPU 23.

The remaining part of the cooling air applied through the outlet port 64 of the second fan unit 60 is guided into the base 40. The cooling air can therefore cools the extension components contained in the base 40, such as the CD-ROM drive 44 and the floppy disk drive 45. The extension components can thereby be maintained at appropriate operating temperatures.

Figure 8:
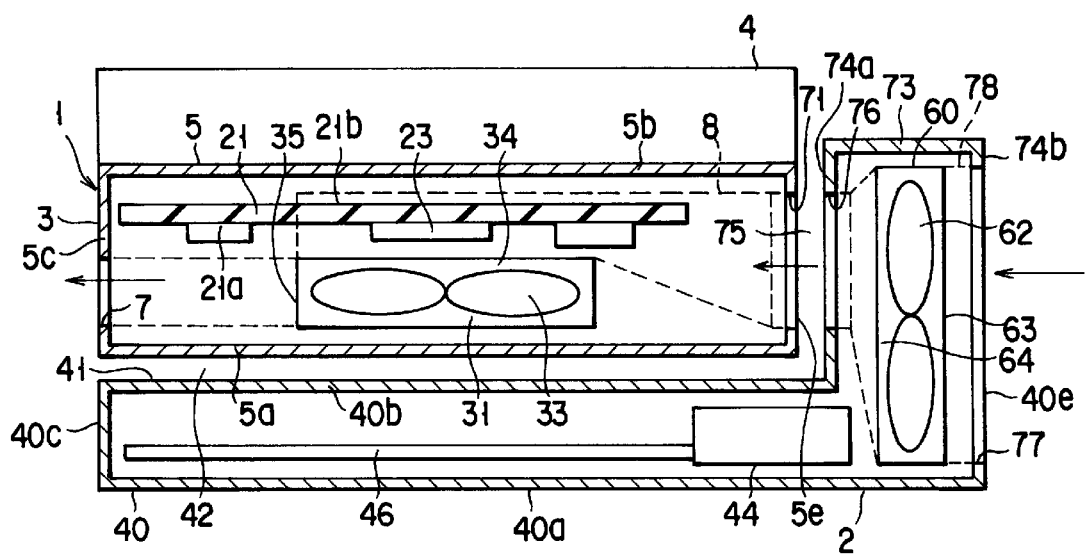
FIG. 8 is a sectional view of an electronic apparatus system that is the fifth embodiment of the invention, diagrammatically explaining how cooling air flows from the extension apparatus into the portable computer.

FIG. 8 shows an electronic apparatus system that is the fifth embodiment of the invention. In the fifth embodiment, the first fan unit 31 is located below the MPU 23. As shown in FIG. 8, the inlet port 34 of the first fan unit 31 opens upwards at a position below the MPU 23. Thus, when the first fan unit 31 is driven, the cooling air drawn into the inlet port 71 of the housing 5 flows into the inlet port 34 of the first fan unit 31 after flowing over the MPU 23, as is indicated by the arrow in FIG. 8. A stream of cooling air is thereby formed around the MPU 23.

That is, the fifth embodiment is characterized in that the first fan unit 31 is positioned at the downstream of the cooling air, with respect to the MPU 23.

The present invention is not limited to the embodiments described above. Rather, various changes and modifications can be made, without departing from the scope and spirit of the invention. For example, the inlet port of the housing and the exhaust port of the base need not oppose. Instead, they may be arranged to indirectly communicate through the gap between the housing and the mount section.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An extension apparatus to which an electronic apparatus, which has a housing having an inlet port and a first fan unit provided in the housing for drawing cooling air into the housing through the inlet port, is to be removably connected, the first fan unit being located opposite to the inlet port, said extension apparatus comprising:

a base on which the housing of the electronic apparatus is to be removably mounted, said base having an exhaust port being located opposite to the inlet port of the housing when the housing is mounted on the base;

components which are provided in the base and which are to be electrically connected to the electronic apparatus when the housing is mounted on the base; and a second fan unit provided in the base in such a manner as to be opposed to the exhaust port, for forming a stream of cooling air in the base, which flows towards the exhaust port, said second fan unit being located opposite to the first fan unit when the housing is mounted on the base.

2. An extension apparatus according to claim 1, wherein the housing has a bottom wall having the inlet port, the base has a mount section which has the exhaust port and on which the bottom wall of the housing is to be removably mounted, and the mount section of the base cooperates with the bottom wall, providing a gap communicating with the exhaust port and the inlet port, when the bottom wall of the housing is mounted on the mount section.

3. An electronic apparatus system comprising:

an electronic apparatus having a housing, a heat-generating component provided in the housing, and a first fan unit provided in the housing, for drawing cooling air into the housing, thereby to cool the heat-generating component; and an extension apparatus having a base on which the housing of the electronic apparatus is mounted, components provided in the base for extending a function of the electronic apparatus, and a second fan unit for forming a stream of cooling air in the base, wherein the housing has an inlet port located close to the first fan unit, for drawing cooling air into the housing, the base has an exhaust port which is located close to the second fan unit, and into which the cooling air is guided by the second fan unit, and the first and second fan units are opposite to each other while the housing remains mounted on the base.

4. An electronic apparatus system according to claim 3, wherein the housing has a bottom wall having the inlet port, the base has a mount section which has the exhaust port and on which the bottom wall of the housing is removably mounted, the mount section of the base and the bottom wall of the housing cooperate, forming a gap, and the exhaust port and the inlet port communicate with the gap.

5. An extension apparatus to which an electronic apparatus, which has a housing having an inlet port and a first fan unit provided in the housing for drawing cooling air into the housing through the inlet port, is to be removably connected, said extension apparatus comprising:

a base on which the housing of the electronic apparatus is to be removably mounted, said base having an exhaust port which at least partially communicates with the inlet port of the housing when the housing is mounted on the base;

components which are provided in the base, and which are to be electrically connected to the electronic apparatus when the housing is mounted on the base; and a second fan unit provided in the base, for forming a stream of cooling air in the base, which flows towards the components such that a portion of the cooling air flows toward the export port.

6. An electronic apparatus system comprising:

an electronic apparatus having a housing, a heat-generating component provided in the housing, and a first fan unit provided in the housing, for drawing cooling air into the housing, to thereby cool the heat-generating component; and an extension apparatus having a base on which the housing of the electronic apparatus is mounted, components provided in the base, for extending a function of the electronic apparatus, and a second fan unit provided in the base, for forming a stream of cooling air in the base, which flows toward the components, wherein the housing has an inlet port communicating with the first fan unit, for drawing cooling air into the housing, and the base has an exhaust port which at least partially communicates with the inlet port when the housing is mounted on the base, whereby a portion of the cooling air in the base is guided to the exhaust port.

* * * * *